Patented May 29, 1951

2,554,872

UNITED STATES PATENT OFFICE 2,554,872

SALAD OILS AND METHOD OF PRODUCING THE SAME

Sidney Musher, New York, N. Y., assignor to Musher Foundation Incorporated, New York, N. Y., a corporation of New York No Drawing. Application January 26, 1950, Serial No. 140,751

13 Claims. (Cl. 99—118)

The present invention relates to the production of a blended vegetable oil having an intense olive flavor and yet containing only a very minor amount of an olive oil which has been prepared by a special process as well to an olive oil which has a novel and distinctive olive flavor.

Blended or mixed olive oil and vegetable oils have in the past been prepared but in order to obtain any degree of olive oil flavor, it has been necessary to add at least about 30% to 40% of olive oil to a refined vegetable oil. Even so, the resultant blended oil containing 30% or more of olive oil, to the extent that any olive oil flavor is carried, has the characteristic "greasiness" and heaviness of olive oil to which many people object.

An object of the present invention is therefore to produce a salad oil at low cost and carrying an unusual, distinctive and highly desirable flavor and aroma of olives, the intensity of such flavor being marked even where as little as 1% to 5% of a special oil derived by the expression of specially processed olives is used for blending with a refined vegetable oil.

A further object is to provide an oil with an intensified olive flavor which has substantially none of the objectionable physical or flavor characteristics of olive oil and which can readily be used in the manufacture of mayonnaise, French dressing, in the preparation of fishery products and particularly for use as a salad oil as well as for other culinary purposes.

A still further object is to provide an oil which although it can be called by the term "olive oil" yet is far different by reason of flavor and physical characteristics because of enzyme activity during a fermentation and aging process of olives in brine prior to expression.

Still further objects and advantages will appear from the more detailed description set forth below, it being understood, however, that this more detailed description is given by way of illustration and explanation only and not by way of limitation since various changes therein may be made by those skilled in the art without departing from the scope and spirit of the present invention.

In accordance with the procedure of the present invention, fully ripe olives are used as removed from the tree without dehydration or drying of the olives and with the olives having at least substantially the moisture content they have on being picked. These olives are aged, fermented and enzyme reacted in an aqueous dilute salt brine solution for a period of at least about six months. The aging procedure is conducted by placing the olives as picked in a relatively dilute common salt or sodium chloride solution in which the olives are subjected to an enzymatic reaction and fermentation and the olives are held in this salt solution for a period of at least about six months without any dehydration or shrivelling taking place.

During this aging procedure while the olives are immersed in the relatively dilute common salt solution there is apparently an enzymatic reaction which takes place which apparently changes the physical, chemical and flavor and aroma characteristics of the oil contained in the olives.

The common salt solution needed for the fermentation of the olives will range between 5% and about 13% of common salt and desirably between 7% and 10% salt in the brine. This is not the percentage of salt in the olives after fermentation but in the brine during fermentation.

The ripe olives when taken from the tree are held in a sodium chloride solution of desirably 35° to 40° salometer reading. The ripe olives are placed into barrels with the bung of the barrel held loosely on the top to permit the fermentation and enzyme reaction to take place. Every three or four days, the brine is tested for salometer reading and sufficient additional salt is added to maintain the salometer reading at the desired level, namely, 35° to 40°. It will normally require about 60 days for most of the fermentation to have taken place and the fermentation will be observed by bubbling of the brine which makes it necessary that the bung of the barrel be held loosely at its top. The enzyme reaction will continue to take place over a period of about six months in order to place the olives into a condition where they can be used in accordance with the procedures of the present invention.

These ripe olives should be held in the dilute common salt solution for a period of at least about six months. The ripe olives may be retained in the salt solution for a period of as long as a year or more and the retention of these olives in the salt solution for at least six months before using them in accordance with the procedures of the present invention is highly desirable as rendering them much more useful for the purposes herein set forth inasmuch as where the olives are held only for a period of sixty days their usefulness will in no manner be comparable to that where they are held for the period of six months or more.

The time period herein specified is based upon holding the olives under normal room temperature conditions. Where the olives are held at slightly higher temperatures as, for example, at 85° F. to 95° F. under which conditions the fermentation will take place more rapidly, the time period may be shortened somewhat, as for example, four to five months.

The olives should in no case be subjected to an elevated temperature treatment prior to the curing which would inactivate or kill the enzymes. For example, the olives should not be boiled or heated to a temperature of 180° F. or more as if the olives are subjected to an elevated temperature treatment either in the salt solution or before brining and before the enzyme reaction and fermentation has taken place, the unusual results of the present invention are not obtained.

Any variety of ripe olives may be used for this aging operation. For example, olives of the Manzanilla, Mission, Sevillano, or Escalano variety may be employed or olives as produced in the Mediterranean districts including those from Italy, Greece, Spain, Tunis or other parts of Africa may be employed. Ripe olives are utilized inasmuch as it has been found that these fully ripe olives become fermented and enzyme reacted when held in the salt solution.

It is important not to use a commercial brine solution containing, for example, 20% or more common salt which would cause substantial dehydration and shrivelling of the olive flesh and which would not leave an adequate amount of the aqueous fraction in the olive which is largely responsible for the intensification of the flavor and for the fermentation desired in accordance with the procedures herein set forth.

At the close of the fermentation and curing period, the fermented, aged ripe olives which are in substantially non-dehydrated, fermented and enzyme reacted condition are then removed from the dilute salt brine solution and are finely ground as by the use of an attrition, stone or hammer mill to obtain a substantially free flowing olive material having a high moisture content.

These olives are then expressed as by the use of hydraulic pressure to remove the aqueous as well as the oil fraction contained in these olives.

The oil is then separated from the aqueous fraction as by the use of a centrifuge or by gravity settling.

This oil obtained from the fermented, enzyme reacted, non-dehydrated, aged in dilute brine, cured olives is totally different from ordinary olive oil and carries a novel and distinctive flavor as well as other unusual characteristics.

Particularly when this oil is used for blending with refined deodorized vegetable oils in amounts of 10% to 15% or less and even in amounts of 1% to 5% against the weight of the deodorized vegetable oils with which it is used, an intense olive flavor is obtained in the finished blended oil. This intense flavor is new and distinctive and even where as little as 1% to 5% of the oil from the fermented, enzyme reacted olives is blended with from 99% to 95% of a refined vegetable oil, the unusual flavor carries over into the refined vegetable oil in a concentrated manner.

The refined vegetable oils that may be used for admixture or blending with the oil from fermented and aged ripe olives include any variety of refined deodorized vegetable or glyceride oils such as peanut oil, cottonseed oil, corn oil, sunflower seed oil, sesame oil or soybean oil.

With respect to the oil which is expressed from the fermented, aged ripe olives and which is removed from these olives along with the aqueous fraction of the olives, the said oil may where desired be admixed with a small amount such as up to about 1% of a filter aid in order to absorb the balance of the moisture after the major amount of the aqueous fraction has been separated from the oil. In other words the combination of the aqueous fraction and the oil expressed from the fermented ripe olives may be put through a centrifuge or subjected to gravity settling and then the oil fraction may be further processed with a filter aid by adding thereto up to about 1% of a diatomaceous earth with agitation and followed by removal of the diatomaceous earth or filter aid by filtration to produce a brilliantly clear oil.

It is apparent that during the fermentation and enzyme reaction upon the olives as a result of the curing and aging period in the dilute salt brine solution, the aqueous fraction of the substantially non-dehydrated olives develops certain oil solubles which are imparted to the oil upon expression.

The unusual feature of the present invention is that the oil which is obtained after fermentation of the ripe olives in accordance with the procedures herein set forth and by the use of the substantially non-dehydrated olives has an intense flavor without the fattiness or greasiness or heavy body of olive oil and which flavor can be imparted in a concentrated manner to refined vegetable oils when the said oil is blended with such refined deodorized vegetable oil in a very minor amount.

As examples of the procedures herein set forth, although not limited to these specific examples, the following are given:

*Example I*

Ripe Mission olives as taken from the trees and in non-dehydrated form were immersed in a 45° salometer reading common salt solution and the salt content was maintained at 45° in this solution for a period of sixty days. During this time the bung was allowed to remain loosely over the barrels and fermentation took place with bubbling of the brine and at the same time an enzyme reaction occurred. The ripe olives were allowed to remain in this dilute salt solution for a total period of six months. At the close of this period, the moisture content of these olives remained at about 70%. After the fermentation and curing period of about six months, the olives were removed from the dilute salt solution and ground to form a free flowing olive material. These ground olives were then expressed to remove a combination of oil and brine. The brine was then separated from the oil by centrifuging and to the resultant oil there was added 0.5% of "Celite 505" with agitation followed by filtration to produce a brilliantly clear oil. The oil that was obtained had an unusual olive flavor of intensified character without the greasiness or fattiness of pure olive oil and was of excellent quality.

*Example II*

The oil produced in accordance with Example I above was blended in an amount of 3% with 97% refined deodorized corn oil and after mixture of the two oils it was found that the resultant oil had a pronounced, desirable and new type of olive flavor which could not at all be obtained by any blending or mixing of ordinary olive oil even where 20% of ordinary olive oil was blended with 80% of refined deodorized corn oil.

As will be observed from the above, the novel oil produced from the fermented non-dehydrated olives in the dilute salt solution not only had a new and novel flavor but also had an intensified flavor when used for blending purposes in very small amounts with refined deodorized vegetable oils.

It has been found desirable to include with the blended oil a small amount of less than 2% and desirably between 0.25% and 1% of a dry degerminated crude corn oil. This crude corn oil is prepared by dry degerminating corn as distinguished from the wet milling method of removing the germ from the corn, which latter method involves the use of sulphurous acid. The dry milled corn germ is then subjected to expression by an Anderson expeller or solvent extraction and then the dry processed crude corn oil is added to the oil or admixed in the amount given to further enhance or emphasize the olive flavor.

Strangely, it has been found that although the crude dry degerminated corn oil has no flavor characteristic resembling in any manner that of olives, nevertheless where it is added to the oil before, during, or after admixture with the olives an even more emphasized olive flavor is obtained far in excess of what is obtained by the use of the olives alone.

In the case of the examples given above, the olives used were firm and plump and showed no shrivelling of the olive skin even after fermentation and drying and enzyme reaction.

*Example III*

A quantity of ripe Mission olives selected from one orchard and having a moisture content of 71.5% were removed from the trees. A portion was ground immediately and expressed and the oil fraction was separated from the aqueous fraction and used for blending in an amount of 8% with 92% refined deodorized corn oil. The resultant oil had no detectable flavor characteristics.

Another portion of the olives from the same orchard and of the same degree of ripeness were placed into a 7% salt solution and held in a barrel with the salt solution maintained at 7% concentration for sixty days. The olives were allowed to remain in the barrel for a total period of six months. At the end of this period, the olives showed upon analysis a moisture content of 68.8%. These olives were then removed from the dilute salt solution after fermentation and enzyme reaction and were ground and expressed followed by separation of the aqueous fraction from the oil fraction. The resultant oil was combined in an amount of 8% with 92% of refined deodorized corn oil. The resultant blend of 92% corn oil and 8% of oil expressed from the non-dehydrated fermented enzyme reacted and aged olives showed an intensified and novel flavor characteristic.

The olives used in accordance with the procedure of the present invention are desirably in substantially non-dehydrated condition and no more than about 10% to 15% of the moisture originally contained in the olives will generally have been removed during the long aging, enzymic activation and fermentation period of holding in the dilute salt solution. The olives will be substantially plump and may be firm or soft dependent upon the length of time the olives have been aged. Where the olives have been subjected to the aging for a period of a year or even longer, they are excellently suited for the procedure herein set forth.

During the aging period, the olives are desirably exposed to air as by removal of the bung or head of the barrels in which the olives are held or by direct aeration as by bubbling air through the salt solution containing the olives. The temperature to which the olives are subjected during the processing period is generally at room temperature although where desired moderately warm temperatures may be used as up to about 100° F. to 110° F. The aeration is considered very desirable for the intensification of the flavor.

Enzyme activators may be included in the processing of the olives, particularly in the form of the metallic salts and preferably by the use of the higher valence salts such as aluminum chloride. These salts may be added with the sodium chloride in the amount of 1 to 25 p. p. m. or more. Any of the salts or agents which provide enhanced enzymic activity will produce the desired effect upon the olives, producing an olive that may be utilized in accordance with the procedures herein set forth.

It is characteristic of the fermentation and enzyme reaction for a scum or mold growth to develop on the surface of the brine in which the olives are cured and particularly when the curing takes place for a longer period than six months. This scum or mold is an excellent indication of the development of the type of reaction that is desired for use in accordance with the procedures of the present invention.

The ripe olives which are fully fermented and cured in accordance with the procedures herein set forth may specifically be identified as olives which before fermentation will yield upon expression at least about thirty gallons per ton of oil and desirably about forty gallons per ton of the oil.

The olives may also be fermented in brine to which is added other enzymes that increase the enzyme reaction of the olives and develop a faster reaction within the olives.

Together with or in lieu of refined vegetable oil or glyceride oil there may also be employed mineral oil desirably of approximately the same viscosity as a vegetable oil and which may be admixed with the oil expressed from the aged, enzyme reacted, fermented ripe olives in accordance with the procedures set forth.

The olives used in accordance with these procedures as referred to herein are in substantially non-dehydrated form. These olives in ripe condition will have a moisture content of at least 50% and desirably of 55% to 60% or more. The higher the moisture content of the olives after the aging and enzyme reaction, the greater will be the intensification of olive flavor when the olives are expressed and the oil utilized in accordance with the procedure herein set forth.

Where desired, the ripe olives may be enhanced in enzymic activity by subjecting them in the dilute salt solution to sonic or supersonic oscillation and desirably to at least within sonic frequencies. For example, the olives may be immersed in the salt solution in a receptacle such as in a large wooden tank, for example, in which there is placed a diaphragm vibrating at sonic oscillation.

It has been found highly desirable for the ripe olives during the curing and fermentation period in brine to be aerated such as by bubbling air through the brine in which the ripe olives are held in order to accelerate the enzyme and fermentation reaction. This can be conducted by placing the ripe olives in the brine at the proper salometer reading into a hogshead or cask or barrel or other container and, for example, during 24 hours period blowing air through a tube at the bottom of the container for a period of 15 minutes to 30 minutes or more. Under these circumstances the rate of reaction of the fermentation and enzymic activity will be materially increased resulting in a reduction of the time period required for complete curing and fermentation and in the development of a type of brine cured olives which will have much more activity for the purposes described in accordance with the present invention. This aeration may be conducted over a period of 30 to 60 days during which the maximum fermentation and enzymic activity occurs and then where desired the ripe olives may be maintained in the brine for the longer period of time as described in accordance with the procedures herein set forth.

Having described my invention, what I claim is:

1. A method of making an oil having a new and intensified flavor which comprises aging and fermenting ripe olives in a relatively dilute common salt solution for a period of at least about six months, grinding the olives, expressing the olives and separating the oil from the aqueous brine fraction, said salt solution containing between about 5% and 13% common salt.

2. A method of making an oil having a new and intensified flavor which comprises aging and fermenting ripe olives in a relatively dilute common salt solution for a period of at least about six months, grinding the olives, expressing the olives and separating the oil from the aqueous brine fraction, said dilute common salt solution containing between about 5% and 13% of salt.

3. A method of making an oil having a new and intensified flavor which comprises aging and fermenting ripe olives in a relatively dilute common salt solution for a period of at least about six months, grinding the olives, expressing the olives and separating the oil from the aqueous brine fraction, said dilute common salt solution having a salometer reading of between 40° and 45° and containing between about 5% and 13% common salt.

4. A method of making an oil having a new and intensified flavor which comprises aging and fermenting ripe olives in a relatively dilute common salt solution for a period of at least about six months, grinding the olives, expressing the olives and separating the oil from the aqueous brine fraction, said dilute common salt solution having a salometer reading of between 40° and 45° and containing between about 5% and 13% common salt, and said olives having been fermented, aged, enzyme reacted and substantially non-dehydrated during the six months period in the brine.

5. A method of making an oil having a new and intensified flavor which comprises aging and fermenting ripe olives in a relatively dilute common salt solution for a period of at least about six months, grinding the olives, expressing the olives and separating the oil from the aqueous brine fraction, said olives after fermenting and aging having a moisture content of over about 50%, said salt solution containing between about 5% and 13% common salt.

6. A method of making a blended oil having new and intensified flavor which comprises aging and fermenting substantially non-dehydrated ripe olives in a relatively dilute common salt solution for a period of at least about six months, grinding the olives, expressing the olives and separating the oil from the aqueous brine fraction, and then combining at least 85% of a refined vegetable oil with a small amount of under about 15% of the oil expressed from the fermented aged olives, said olives after fermenting having at least about 50% total moisture content, said salt solution containing between about 5% and 13% common salt.

7. A method of making a blended oil having new and intensified flavor which comprises aging and fermenting substantially non-dehydrated ripe olives in a relatively dilute common salt solution for a period of at least about six months, grinding the olives, expressing the olives and separating the oil from the aqueous brine fraction, and then combining at least 85% of a refined vegetable oil with a small amount of under about 15% of the oil expressed from the fermented aged olives, said olives after fermenting having at least about 50% total moisture content and said olives having been fermented, enzyme reacted and substantially non-dehydrated during the brining period, said salt solution containing between about 5% and 13% common salt.

8. A method of making a blended oil having new and intensified flavor which comprises aging and fermenting substantially non-dehydrated ripe olives in a relatively dilute common salt solution for a period of at least about six months, grinding the olives, expressing the olives and separating the oil from the aqueous brine fraction, and then combining at least 85% of a refined deodorized corn oil with a small amount of under about 15% of the oil expressed from the fermented aged olives, said olives after fermenting having at least about 50% total moisture content and said olives having been fermented, enzyme reacted and substantially non-dehydrated during the brining period, said salt solution containing between about 5% and 13% common salt.

9. A glyceride oil expressed from at least six months aged, enzyme reacted, fermented, dilute salt solution immersed ripe olives, said dilute salt solution containing between about 5% and 13% common salt.

10. A glyceride oil expressed from at least six months aged, enzyme reacted, fermented, dilute salt solution immersed ripe olives, said olives containing at least about 50% total moisture after fermentation and enzyme reaction, and said dilute salt solution containing between about 5% and 13% common salt.

11. A blended vegetable oil carrying new and distinctive flavor comprising a major amount of over about 85% of a refined vegetable oil and a minor amount of under about 15% of an oil expressed from fermented, aged, enzyme reacted, substantially non-dehydrated brined ripe olives, said olives having been held in a 5% to 13% common salt brine for at least about six months.

12. A blended vegetable oil carrying new and distinctive flavor comprising a major amount of over about 85% of a refined vegetable oil and a minor amount of under about 15% of an oil expressed from fermented, aged, enzyme reacted, substantially non-dehydrated brined ripe olives, said olives after fermentation having a moisture content of over about 50%, said olives having been held in a 5% to 13% common salt brine for at least about six months.

13. A blended deodorized corn oil carrying new and distinctive flavor comprising a major amount of over about 85% of a refined corn oil and a minor amount of under about 15% of an oil expressed from fermented, aged, enzyme reacted, substantially non-dehydrated brined ripe olives, said olives after fermentation having a moisture content of over about 50%, said olives having been held in a 5% to 13% common salt brine for at least about six months.

SIDNEY MUSHER.

REFERENCES CITED

The following references are of record in the file of this patent:

UNITED STATES PATENTS

| Number | Name | Date |
|---|---|---|
| 2,221,404 | Musher | Nov. 12, 1940 |
| 2,411,201 | Forkner | Nov. 19, 1946 |